United States Patent [19]

Breininger et al.

[11] 4,239,816

[45] Dec. 16, 1980

[54] ORGANIC ADDITIVES FOR ORGANOMETALLIC COMPOSITIONS

[75] Inventors: J. Shannon Breininger, Gibsonia; Charles B. Greenberg, Murrysville, both of Pa.

[73] Assignee: PPG Industries, Inc., Pittsburgh, Pa.

[21] Appl. No.: 965,663

[22] Filed: Dec. 1, 1978

[51] Int. Cl.$^3$ .................... B05D 1/02; B05D 3/02; B05D 5/06; C01C 17/25
[52] U.S. Cl. .................... 427/168; 65/3 R; 427/314; 427/424; 427/427
[58] Field of Search .................... 427/168, 248 R, 255, 427/314, 424, 427; 65/3 R

[56] References Cited

U.S. PATENT DOCUMENTS

| | | | |
|---|---|---|---|
| 3,185,586 | 5/1965 | Saunders et al. | 427/168 X |
| 3,202,054 | 8/1965 | Mochel | 350/316 |
| 3,658,568 | 4/1972 | Donley | 427/168 |
| 3,660,061 | 5/1972 | Donley et al. | 65/32 |
| 4,147,556 | 4/1979 | Donley | 106/287.18 |

*Primary Examiner*—James R. Hoffman
*Attorney, Agent, or Firm*—Donna L. Seidel

[57] ABSTRACT

A coating composition for the pyrolytic deposition of metal oxide films is disclosed comprising an organometallic coating reactant, a high boiling point organic compound which modifies the rate of film formation and decreases the particle size of the metal oxide, and, preferably, a nonflammable halocarbon-containing solvent.

7 Claims, No Drawings

ORGANIC ADDITIVES FOR ORGANOMETALLIC COMPOSITIONS

FIELD OF THE INVENTION

The present invention relates generally to the art of pyrolytic deposition of metal oxide films and particularly to the art of depositing nonconductive metal oxide films onto a freshly formed float glass surface from a nonflammable, high-boiling solution of organometallic coating material.

THE PRIOR ART

The pyrolytic deposition of transparent, colored electrically nonconductive metal oxide films on glass is well-known. Such films are typically formed by contacting a hot glass surface in an oxidizing atmosphere with an organic solution of an organometallic coating reactant. Suitable organometallic compounds include transition metal 2-ethyl hexanoates as described in U.S. Pat. No. 3,185,586 to Saunders et al, transition metal 1,3-beta diketonates as described in U.S. Pat. No. 3,202,054, and metal carboxylates containing quaternary alpha carbon atoms such as the metal neodecanoates described in U.S. Pat. No. 3,658,568 to Donley. Various organic solvents such as benzene, methanol and trichloroethane are disclosed. The metal oxide films typically have aesthetically pleasing colors, essentially infinite resistivity (greater than $10^6$ ohms per square) and are useful for solar energy control.

In the float environment it is generally preferred to apply the organometallic coating solution to the glass surface just after it has been formed, while the temperature is about 1100° F. (about 593° C.). In this environment, the organic solvents used evaporate rapidly so that the organometallic coating material may contact the glass surface nonuniformly resulting in nonuniformity in the texture of the metal oxide film.

In U.S. Pat. No. 4,147,556, Donley discloses that the solubility of some coating reactant can be improved by adding a liquid phenolic compound such as cresol to a high boiling halocarbon solvent system.

It is known that substantial concentrations of phenolics such as cresol are toxic. In addition, they are incompatible with some compositions, especially aqueous solutions. It is now believed that the addition of phenolic compounds to pyrolytic coating compositions improves the quality of the film, altering the grain size and morphology of the metal oxide coating by affecting the fluid dynamics of the sprayed coating solution.

SUMMARY OF THE INVENTION

The present invention involves the addition of a relatively non-toxic organic material having a high boiling point and high surface tension to an organometallic coating composition. The organic material increases the lifetime of particles of the coating composition in the hot coating environment, thus increasing the concentration of metal-containing coating reactant at the surface of the substrate to be coated resulting in the deposition of a more uniform, less porous, and therefore more durable, metal oxide film. Organic materials having a high boiling point and high surface tension in relation to the solvent are useful, and those which have a boiling point greater than 200° C. are preferred. Most preferred additives are organic materials having a boiling point at or above the vaporization temperature of the organometallic coating reactant.

DESCRIPTION OF THE PREFERRED EMBODIMENTS

In a typical float glass operation, a continuous glass ribbon is drawn along the surface of a bath of molten metal. The bath is usually tin or tin-containing alloy in a reducing atmosphere. The bath is maintained at an elevated temperature so that the glass ribbon in contact therewith is sufficiently soft to flow. The temperature of the bath is progressively decreased along the direction of ribbon movement to permit the ribbon to harden and form. The hardened glass is removed from the end of the bath and conveyed through an annealing lehr on conventional conveyor rolls. A typical process for making float glass is described in U.S. Pat. No. 3,083,551.

The coating composition of the invention is applied at a coating station which is located between the end of the molten metal bath and the beginning of the annealing lehr. At this location, conditions are excellent for pyrolytically depositing a metal oxide coating. The temperature of the glass is about 1100° F. (about 593° C.) at this point, and there is sufficient oxygen in the surrounding air to insure the formation of metal oxide. The coating can be applied by a method such as disclosed in U.S. Pat. No. 3,660,061, which disclosure is incorporated herein by reference. A spray is applied from a spray gun at a rapid velocity toward the glass ribbon, and traversing a relatively short distance en route to the ribbon so as to have the coating composition contact the glass uniformly. Preferably, the distance from the spray gun to ribbon surface is on the order of one foot (about 0.3 meter) or less. The composition of the invention may be stored under pressure in an enclosed system and delivered to spray guns in conduits insulated from the hot environment of the coating station. The spray guns may be packed in thermal insulation to insulate the spray solution from the hot atmosphere of the spraying station, thus keeping the solution in the liquid state and maintaining the metal concentration at the desired level until the spray is emitted from each spray gun.

The organometallic coating reactant may be a transition metal 2-ethylhexanoate, a beta diketonate, a neodecanoate or other organometallic compound which thermally decomposes to form a metal oxide. Preferred organometallic compounds for use according to the present invention are beta diketonates of a metal capable of reacting to form a metal oxide upon contact with a surface at a temperature of about 900° to 1200° F. (about 482° to 649° C.). The metal is selected from those having an atomic number from 22 to 92, preferably a metal from the first transition series, most preferably cobalt, iron, chromium, copper, manganese, nickel and mixtures thereof. The metal is believed to chelate with the carbonyl oxygens of the beta diketonate to form a compound having the following structure:

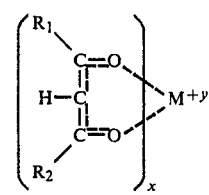

where x and y are equal and y stands for the oxidation state of the transition metal and x stands for the number of ligands chelated with the transition metal.

In the above structure, $R_1$ and $R_2$ can be the same or different. For example, $R_1$ and $R_2$ can be aromatic, such as phenyl, substituted phenyl such as p-methoxy phenyl and p-fluorophenyl, or can be a fused aromatic structure such as naphthyl. $R_1$ and $R_2$ can be heterocyclic such as 2-thienyl and 2-furyl. Also $R_1$ and $R_2$ can be aliphatic, such as lower alkyl and lower substituted alkyl, particularly methyl, ethyl, isopropyl and n-propyl and trifluoromethyl and hexafluoropropyl. Further, $R_1$ and $R_2$ can be combined in the form of a ring structure, such as 1,3-cyclohexanedione. Specific examples of beta diketonates which are in accordance with this invention are the following:
2-acetylcyclohexanone
1,3-bis (p-fluorophenyl)-1,3-propanedione
1,3-bis (p-methoxyphenyl)-1,3-propanedione
5,5-dimethyl-1,3-cyclohexanedione
2,6-dimethyl-3,5-heptanedione
1,3-di(2-naphthyl)-1,3-propanedione
1,5-diphenyl-1,3,5-pentanetrione
1,3-diphenyl-1,3-propanedione
1-(2-furyl)-1,3-butanedione
4,4,5,5,6,6,6-Heptafluoro-1-(2-thienyl)-1,3-hexanedione
3,5-heptanedione
1,1,1,5,5,5-hexafluoro-2,4-pentanedione
2,4-hexanedione
6-methyl-2,4-heptanedione
4,6-nonanedione
2,4-pentanedione
1-phenyl-1,3-butanedione
1-phenyl-2,4-pentanedione
2,2,5,5-tetramethyl-1,3-cyclohexanedione
1-(2-thienyl)-1,3-butanedione
1,1,1-trifluoro-3,5-dimethyl-2,4-hexanedione
4,4,4-trifluoro-1-(2-furyl)-1,3-butanedione
1,1,1-trifluoro-2,4-hexanedione
1,1,1-trifluoro-6-methyl-2,4-heptanedione
1,1,1-trifluoro-5-methyl-2,4-hexanedione
4,4,4-trifluoro-1-(2-naphthyl)-1,3-butanedione
1,1,1-trifluoro-2,4-pentanedione
4,4,4-trifluoro-1-phenyl-1,3-butanedione
4,4,4-trifluoro-1-(2-thienyl)-1,3-butanedione
Preferred beta diketonates are the 1,3-beta diketonates, such as the acetyl acetonates in which $R_1$ and $R_2$ are both methyl. Various other transition metal beta diketonates are described by commercial manufacturers such as Harshaw Chemical Company. Techniques for their preparation are described by Werner in Berichte, 34 (1901), pages 2592–2593, by Morgan and Moss, *Journal of the American Chemical Society*, 105 (1914), pages 189–201, and in *Gach Monatshefte*, 21 (1900), page 103.

It is desirable at times to use a mixture of metal beta diketonates particularly transition metal beta diketonates. In certain instances, it has been found that particular mixtures of beta diketonates produce transparent mixed metal oxide coatings with improved physical and optical properties over those achievable using only one metal beta diketonate. Furthermore, by using various combinations of two or more transition metal beta diketonates, it is possible to get a wide spectrum of pleasing colors in the resultant mixed oxide coatings. For example, the mixture of iron, chromium, and cobalt acetyl acetonates gives a resultant transparent mixed metal oxide coating which has greater chemical durability and resistance to surface abrasion than does a comparable metal oxide coating made from any one or two of the particularly mentioned transition metal acetyl acetonates. Moreover, the combination of iron, chromium and cobalt acetyl acetonates in various proportions gives resultant transparent mixed metal oxide coatings which have a wide variety of pleasing colors. In fact, from this particular combination, it has been found that there are as many as 260 distinct colors possible, ranging from browns to greens, as determined by dominant wavelength and excitation purity as derived from tristimulus values that have been adopted by the Internation Commission on Illumination. An understanding of the determination of color may be obtained by reference to *Handbook of Colorimetry*, prepared by the staff of the Color Measurement Laboratory, Massachusetts Institute of Technology, under the direction of Arthur C. Hardy, printed in 1936 by the Technology Press, Massachusetts Institute of Technology, Cambridge, Mass.

Solvent systems useful in practising the present invention may include organic solvents well-known in the art such as benzene, toluene, xylene, mesitylene, aliphatic hydrocarbons such as hexane and heptane, and aliphatic alcohols such as methanol and ethanol. However, nonflammable solvents such as halogenated hydrocarbons are preferred. The halogenated hydrocarbon is preferably a compound containing from 1 to 4 carbon atoms, preferably a halogenated hydrocarbon containing 1 or 2 carbon atoms, and more preferably, a halocarbon compound containing 1 or 2 carbon atoms and having at least as many chlorine and/or bromine atoms as carbon atoms. The most preferred halocarbon compounds are methylene chloride and halocarbons containing two carbon atoms and having at least as many chlorine substituents as carbon atoms, e.g., perchloroethylene and trichloroethylene.

The halocarbon should constitute at least 20 percent, preferably at least 40 percent, by volume of the total organic solvent system. Examples of the various halocarbons which can be used alone or mixed together include the following: methylene chloride, chloroform, carbon tetrachloride, 1,1,1-trichloroethane, 1,1,2-trichloroethane, 1,1,2,2-tetrachloroethane, 1,1,1,2-tetrachloroethane, pentachloroethane, trichloroethylene, perchloroethylene, 1,2-dichloropropane, 1,3-dichloropropane, hexachloropropane, hexachlorobutadiene, trichloromonofluoromethane, dichloroiodomethane, 1,1,1-tetrachloro-2-fluoroethane and 1,1,2-trichloro-1,2-difluoroethane.

As has been mentioned, halocarbons and halocarbon mixtures containing 1 or 2 carbon atoms are preferred because they have greater solvent power for the metal beta diketonate. When 3 or 4 carbon atom halocarbons are employed in the mixtures, the solvent power of the organic solvent is decreased. Specific halocarbon mixtures which are most desirable are the following: methylene chloride and at least one other halocarbon compound chosen from perchloroethylene, trichloroethylene and 1,1,1-trichloroethane.

With regards to solubility, it has been found in preparing compositions of this invention that mixtures of halogenated hydrocarbons containing from 1 to 2 carbon atoms and at least as many halogen atoms as carbon atoms exhibit synergistic activity in their combined form towards dissolving certain transition metal beta diketonates. In other words, a specific volume of a mixture of the halogenated hydrocarbons used in the practice of this invention has greater solvating power in dissolving transition metal beta diketonates than does the same volume of a single halogenated hydrocarbon. Therefore, mixtures of halogenated hydrocarbons are preferred solvent systems. Particularly preferred solvent systems are those comprising methylene chloride and a halogenated hydrocarbon containing two carbon atoms and at least as many chlorine atoms, e.g., trichloroethylene, perchloroethylene or trichloroethane. Enhanced solubility of transition metal beta diketonates can be achieved by the inclusion of a polar solvent such as a lower aliphatic alcohol, preferably methanol, in the solvent system. Numerous suitable solvent systems are disclosed in U.S. application Ser. No. 764,249 filed Jan. 31, 1977, now U.S. Pat. No. 4,147,556, the claims in which were allowed Oct. 13, 1978, which disclosure is incorporated herein by reference.

The solvent system should have dissolved therein at least about 1 percent, preferably 1 to 5 percent, by weight of total metal based on the total weight of the composition. For use in coating glass, higher metal contents, i.e., higher than 10 percent by weight total metal in the composition, are not recommended because the heated substrate has insufficient thermal energy to uniformly convert the organometallic coating reactant to the metal oxide. However, there should be greater than one percent total metal in the coating compositions in order to get the desired reflectance and solar energy absorption to make the glasses useful as solar radiation filters in architectural applications. Further, a low metal content results in rapid cooling of the substrate, which decreases the efficiency of pyrolysis and the film forming rate leading to the formation of a metal oxide coating having less than optimum thickness. The organometallic coating reactant may simply be added to a desired volume of a particular solvent system, with stirring at ambient temperature. When mixed metal beta diketonate solutions are desired, the individual metal beta diketonates can be combined in the desired ratios and then added in the combined form to a particular solvent system. Alternately, the individual metal diketonates can be dissolved individually in a particular solvent and the solutions combined to form the particularly desired mixture of metal beta diketonates in solution. This latter technique of first individually dissolving the metal beta diketonates and then combining the individual solutions is particularly useful in preparing solution mixtures containing transition metal beta diketonates that are more difficult to dissolve, such as nickel and copper acetyl acetonates. Higher amounts of nickel and/or copper acetyl acetonates can be solubilized by dissolving them individually in a particular solvent mixture and then combining the solutions with others individually prepared.

According to the present invention, a high boiling point, high surface tension organic compound is added to the solution of organometallic coating reactants in order to increase the lifetime of coating composition particles in the hot coating environment thereby improving the uniformity and durability of the metal oxide film. The organic compound may be added to the solvent system before the organometallic coating reactants are dissolved or may be added to the coating reactant solution any time prior to use.

The organic compounds considered to be useful according to the present invention are those compounds having a boiling point of about 200° C. or greater which are compatible with the organometallic coating reactants and solvents of the herein described coating method. Those materials having low toxicity are preferred. The coating compositions of the present invention may therefore include such materials as benzyl alcohol, benzyl benzoate, phenylpropyl alcohol, acetophenone, ethyl benzoate, 3-pentyl-1-propanol, ethyl cinnimate, benzophenone, cetyl alcohol, stearic acid, 1-ethyl-4-propyl benzene, amylbenzene, butyleneglycol, 8-isoamylene glycol, 2-butanoic acid, pentylcyclohexane, 3-decanone, allyl-2-tolyl ether, benzyl, formate, 2-methyl benzyl alcohol, methyl benzoate, diethyl tartrate, 2-phenyl-2-propanol, hexanediol, isoamyl salicylate, 1-decanol, glycerol, hexanoic acid, methyl maleate, or malonic ester. Numerous other organic materials which increase the boiling point of the coating composition may also be used.

The coating composition is preferably sprayed, in the form of an atomized mist, onto the hot refractory substrate. By spraying, better control is obtained of the evenness of distribution of the coating composition and therefore the uniformity of thickness of the resultant coating than is obtainable by other application techniques, such as flooding the composition over the substrate surface. The organic additive of the present invention, by increasing the lifetime of coating composition particles in the coating environment further improves the distribution of the coating reactant and therefore the uniformity of the resultant coating. Because the coating reactant is more uniformly concentrated at the glass surface, the resultant coating is less porous and therefore is more durable as determined by contacting the coating with hydrofluoric acid.

Coating compositions of this invention are particularly suitable for applying to refractory substrates at temperatures which will pyrolyze the composition to form an aesthetically appealing, electrically nonconductive (resistivity greater than $10^4$ ohms per square) metal oxide film with substantially uniform thickness on the surface of the substrate. Generally, the pyrolysis temperatures encountered are from about 900°–1200° F. (about 482° to 649° C.) and pyrolysis occurs in an oxidizing atmosphere.

The present invention will be further understood from the descriptions of specific examples which follow.

EXAMPLE I

A float glass ribbon 6 millimeters thick is contacted, while at a temperature of about 1125° F. (about 608° C.), with a coating solution having the following composition:

| methylene chloride | 20 gallons | (84.8 liters) |
| trichloroethylene | 20 gallons | (84.8 liters) |
| cobaltic acetylacetonate | 22.56 kilograms | |
| ferric acetylacetonate | 5.64 kilograms | |
| chromic acetylacetonate | 7.64 kilograms | |
| benzyl alcohol | 5 gallons | (21.2 liters) |

A high quality bronze colored metal oxide film about 350 Angstroms (35 nanometers) thick is formed on the hot glass surface.

EXAMPLE II

A float glass ribbon is contacted with a coating solution as in Example I except that an equimolar amount of benzyl benzoate is substituted for the benzyl alcohol. Again, a high quality bronze colored metal oxide film is formed which is more durable, as determined by immersion in hydrofluoric acid, than glass coated with a similar coating solution without a high boiling point organic additive.

EXAMPLE III

A float glass ribbon is contacted with a coating solution as in Example I except that 1 gallon (about 4.2 liters) of benzyl alcohol is used. Even with the reduced volume of organic material the coated glass is more durable than glass coated with a similar coating solution without a high boiling point organic additive.

The above examples are offered to illustrate the present invention. Other coating reactants, solvents, substrates, temperature conditions and organic additives may be used. Organic additives as described herein with respect to coating solutions, particularly those having a boiling point at or above the vaporization temperature of the coating reactant, may also find use in solventless coating techniques such as chemical vapor deposition. The scope of the present invention is defined by the following claims.

We claim:

1. In a method for forming metal oxide films by contacting a hot surface with a coating composition comprising an organometallic coating reactant which thermally decomposes to a metal oxide, the improvement which comprises adding to said coating composition a relatively nontoxic organic compound having a boiling point of at least 200° C.

2. A method according to claim 1, wherein the organometallic coating reactant is a transition metal beta diketonate.

3. A method according to claim 1, wherein the coating composition comprises a solvent for the organometallic coating reactant and the organic compound has a boiling point substantially higher than said solvent.

4. A method according to claim 3, wherein said solvent comprises a halogenated hydrocarbon containing from 1 to 4 carbon atoms.

5. A method according to claim 4, wherein the organic compound is selected from the group consisting of benzyl alcohol, benzyl benzoate and phenylpropyl alcohol.

6. In a solventless method for forming metal oxide films by contacting a hot surface with a coating composition comprising an organometallic coating reactant which thermally decomposes to a metal oxide, the improvement which comprises adding to said coating composition a relatively nontoxic organic compound having a boiling point of at least about 200° C.

7. A method according to claim 6, wherein the organometallic coating reactant is a transition metal beta diketonate.

* * * * *